United States Patent
Lewis (10) Patent No.: US 10,526,026 B2
(45) Date of Patent: Jan. 7, 2020

(54) CARRIAGE FOR A TRACK DRIVE VEHICLE

(71) Applicant: Barreto Manufacturing, Inc., La Grande, OR (US)

(72) Inventor: Mark Lewis, Union, OR (US)

(73) Assignee: Barreto Manufacturing, Inc., Le Grande, OR (US)

( * ) Notice: Subject to any disclaimer, the term of this patent is extended or adjusted under 35 U.S.C. 154(b) by 161 days.

(21) Appl. No.: 15/881,294

(22) Filed: Jan. 26, 2018

(65) Prior Publication Data

US 2018/0215426 A1    Aug. 2, 2018

Related U.S. Application Data (60) Provisional application No. 62/451,418, filed on Jan. 27, 2017.

(51) Int. Cl.
| | |
|---|---|
| *B62D 55/108* | (2006.01) |
| *B62D 55/10* | (2006.01) |
| *B62D 55/14* | (2006.01) |
| *B62D 55/06* | (2006.01) |

(52) U.S. Cl.
CPC ........... *B62D 55/108* (2013.01); *B62D 55/06* (2013.01); *B62D 55/10* (2013.01); *B62D 55/14* (2013.01)

(58) Field of Classification Search
CPC ...... B62D 55/108; B62D 55/10; B62D 55/14; B62D 55/06; B62D 55/32
See application file for complete search history.

(56) References Cited

U.S. PATENT DOCUMENTS

| | | | | |
|---|---|---|---|---|
| 3,774,708 A | * | 11/1973 | Purcell | B62D 55/10 180/9.5 |
| 3,825,309 A | * | 7/1974 | Krolak | B62D 55/30 305/152 |
| 3,983,851 A | * | 10/1976 | Hoshi | F02D 41/045 123/492 |
| 4,087,135 A | * | 5/1978 | Unruh | B62D 55/305 305/125 |
| 4,887,872 A | * | 12/1989 | Adams | B62D 55/30 305/147 |
| 4,953,919 A |   | 9/1990  | Langford | |

(Continued)

FOREIGN PATENT DOCUMENTS

EP        0800983 A1 * 10/1997 ............ B62D 55/30

*Primary Examiner* — Kip T Kotter (74) *Attorney, Agent, or Firm* — Klarquist Sparkman, LLP (57) ABSTRACT

A carriage assembly includes a primary frame, a first idler wheel mounted to the primary frame, and a secondary frame pivotably mounted to the primary frame. The carriage assembly further includes an idler wheel assembly coupled to the secondary frame and movable with respect to the secondary frame along a longitudinal axis of the idler wheel assembly. The idler wheel assembly includes at least one second idler wheel and at least one third idler wheel mounted to the idler wheel assembly such that the second idler wheel is located between the first idler wheel and the third idler wheel. The first idler wheel is configured to pivot with the primary frame relative to the secondary frame, and the second idler wheel and the third idler wheel are configured to move with the idler wheel assembly relative to the secondary frame along the longitudinal axis of the idler wheel assembly.

20 Claims, 7 Drawing Sheets

(56) References Cited

U.S. PATENT DOCUMENTS

| | | | | |
|---|---|---|---|---|
| 5,005,920 | A * | 4/1991 | Kinsinger | B62D 55/30 |
| | | | | 305/146 |
| 5,842,757 | A | 12/1998 | Kelderman | |
| 6,547,345 | B2 * | 4/2003 | Phely | B62D 55/10 |
| | | | | 180/9.52 |
| 6,904,986 | B2 | 6/2005 | Brazier | |
| 7,467,831 | B2 * | 12/2008 | Bertoni | B62D 55/14 |
| | | | | 305/125 |
| 8,733,850 | B2 * | 5/2014 | Park | B62D 55/305 |
| | | | | 305/143 |
| 2005/0231035 | A1 * | 10/2005 | Vertoni | B62D 55/14 |
| | | | | 305/143 |
| 2007/0290553 | A1 | 12/2007 | Christianson | |
| 2016/0297065 | A1 | 10/2016 | Summer et al. | |
| 2018/0154956 | A1 * | 6/2018 | Fujiki | B62D 55/10 |

* cited by examiner

CARRIAGE FOR A TRACK DRIVE VEHICLE

CROSS-REFERENCE TO RELATED APPLICATIONS

This application claims the benefit of U.S. Provisional Patent Application No. 62/451,418, filed Jan. 27, 2017, which is herein incorporated by reference in its entirety.

FIELD

The present application concerns carriages for continuous track vehicles.

BACKGROUND

Utility vehicles can employ a pair of endless tracks for means of propulsion. These utility vehicles have longitudinally spaced front and rear idler wheels with a plurality of idler or roller wheels distributed between the front and rear idler wheels for load bearing support and terrain adaptability. A drive wheel or sprocket can propel the endless track. When such systems are required to traverse an obstacle or uneven terrain, vertical differences between the idler wheels or roller wheels imposed by the terrain can result in a significant portion of the track losing contact with the ground. This reduces traction, increases ground pressure, and can result in undesired movement of the utility vehicle body. Accordingly, a need exists for improved carriages for track drive vehicles.

SUMMARY

Certain embodiments of this disclosure concern carriages for continuous track vehicles. In a representative embodiment, a carriage assembly comprises a primary frame assembly, a first idler wheel mounted to the primary frame assembly, and a secondary frame assembly pivotably mounted to the primary frame assembly. The carriage assembly further includes an idler wheel assembly coupled to the secondary frame assembly and movable with respect to the secondary frame assembly along a longitudinal axis of the idler wheel assembly. The idler wheel assembly includes at least one second idler wheel mounted to the idler wheel assembly and at least one third idler wheel mounted to the idler wheel assembly such that the at least one second idler wheel is located between the first idler wheel and the at least one third idler wheel. The first idler wheel is configured to pivot with the primary frame assembly relative to the secondary frame assembly, and the at least one second idler wheel and the at least one third idler wheel are configured to move with the idler wheel assembly relative to the secondary frame assembly along the longitudinal axis of the idler wheel assembly.

In some embodiments, the carriage assembly further comprises a spring disposed between the secondary frame assembly and the idler wheel assembly such that motion of the idler wheel assembly relative to the secondary frame assembly compresses and extends the spring.

In some embodiments, the idler wheel assembly includes a carrier member, and the at least one second idler wheel and the at least one third idler wheel are mounted at opposite ends of the carrier member.

In some embodiments, the secondary frame assembly comprises a frame member and a bracket member coupled to and extending outwardly from the frame member. The spring extends between the bracket member and the carrier member.

In some embodiments, a position of the bracket member relative to the frame member is adjustable to adjust tension in the spring.

In some embodiments, the bracket member comprises an L-shaped main body having a first portion extending parallel to the spring and a second portion extending perpendicular to the spring.

In some embodiments, the second portion of the bracket member includes an opening, and the secondary frame assembly further comprises a pin member extending through the opening in the second portion of the bracket member, through the spring, and engaging the carrier member.

In some embodiments, the pin member and the spring are disposed above the carrier member, and the carrier member comprises an extension portion configured to engage the pin member.

In some embodiments, the frame member defines a curved guide opening configured to receive a guide member coupled to the primary frame assembly.

In some embodiments, the frame member is a first frame member, and the secondary frame assembly further comprises a second frame member parallel to and spaced apart from the first frame member. The carrier member, the spring, and the bracket member are disposed between the first and second frame members.

In some embodiments, the carriage assembly further comprises a pair of second idler wheels coupled to the carrier member and a pair of third idler wheels coupled to the carrier member. The first and second frame members of the secondary frame assembly are disposed between the pair of second idler wheels and between the pair of third idler wheels.

In some embodiments, the carriage assembly further comprises a drive sprocket coupled to the primary frame assembly.

In some embodiments, the carriage assembly further comprises a track extending from the first idler wheel to the at least one second idler wheel, the at least one third idler wheel, the drive sprocket, and back to the first idler wheel.

In some embodiments, motion of the idler wheel assembly along its longitudinal axis maintains a preselected tension in the track.

In some embodiments, a vehicle can comprise any of the above carriage assemblies described herein.

In another representative embodiment, a carriage assembly comprises a first frame member, a first idler wheel coupled to the first frame member, and a second frame member pivotably coupled to the first frame member. The carriage assembly can further comprise a carrier member including a first end portion, a second end portion, and a longitudinal axis. The carriage assembly can further comprise a spring coupled to the second frame member at one end of the spring and coupled to the carrier member at the opposite end of the spring such that motion of the carrier member along its longitudinal axis causes extension and compression of the spring. The carriage assembly can further comprise a second idler wheel coupled to the first end portion of the carrier member and movable therewith relative to the second frame member, a third idler wheel coupled to the second end portion of the carrier member and movable therewith relative to the second frame member, and a drive sprocket coupled to the first frame member. The carriage assembly can further comprise a track extending from the first idler wheel to the second idler wheel, the third idler wheel, the drive sprocket, and back to the first idler wheel. When the carriage assembly traverses an obstacle, the first frame member and the first idler wheel pivot relative to the second frame member, and the second idler wheel, the third idler wheel, and the carrier member move relative to the second frame member under influence of the spring to maintain a preselected tension in the track.

In some embodiments, the carriage assembly further comprises a bracket member coupled to the second frame member, the spring extends between the bracket member and the carrier member, and the bracket member is positionally adjustable relative to the second frame member to adjust tension in the spring.

In some embodiments, the carriage assembly further comprises a third frame member spaced apart from the second frame member and coupled thereto, and the bracket member and the carrier member are disposed between and movable relative to the second and third frame members.

In some embodiments, the carriage assembly further comprises a pin member extending through the bracket member, through the spring, and engaging the carrier member.

In some embodiments, the second frame member defines a curved guide opening configured to receive a guide member coupled to the primary frame assembly.

The foregoing and other objects, features, and advantages of the disclosed technology will become more apparent from the following detailed description, which proceeds with reference to the accompanying figures.

DETAILED DESCRIPTION

Described herein are embodiments of carriages for track drive vehicles that enable one or more idler wheels to move in response to terrain traversed by the vehicle in order to maintain a relatively larger proportion of the track in contact with the ground than is possible with known track drive carriages. The disclosed carriages can have a primary frame assembly and a secondary frame assembly that are pivotable relative to one another. A plurality of idler wheels are coupled to the primary frame assembly and the secondary frame assembly, and engage a continuous track that extends around the carriage. At least one of the primary frame assembly or the secondary frame assembly can also include a frame or carrier member that is longitudinally movable relative to the frame assembly to which it is coupled. This can allow one or more idler wheels coupled to the frame member to move with respect to the primary and secondary frame assemblies to maintain a preselected tension in the track as the vehicle moves.

The disclosed technology can be applicable to any vehicle having a continuous track propulsion system, including utility vehicles such as walk-behind vehicles or riding vehicles (e.g., trenchers, chippers, mulchers, shredders, lawn mowers, snowmobiles, etc.), construction vehicles (e.g., bulldozers, excavators, skid-steer loaders, etc.), military vehicles, or the like. Although the disclosed technology may also be applied in an analogous manner to vehicles with other types of multi-wheel traction systems, the following description proceeds with reference to exemplary tracked land vehicles as non-limiting examples in order to conveniently illustrate the details of the disclosed technology.

Figure 1:
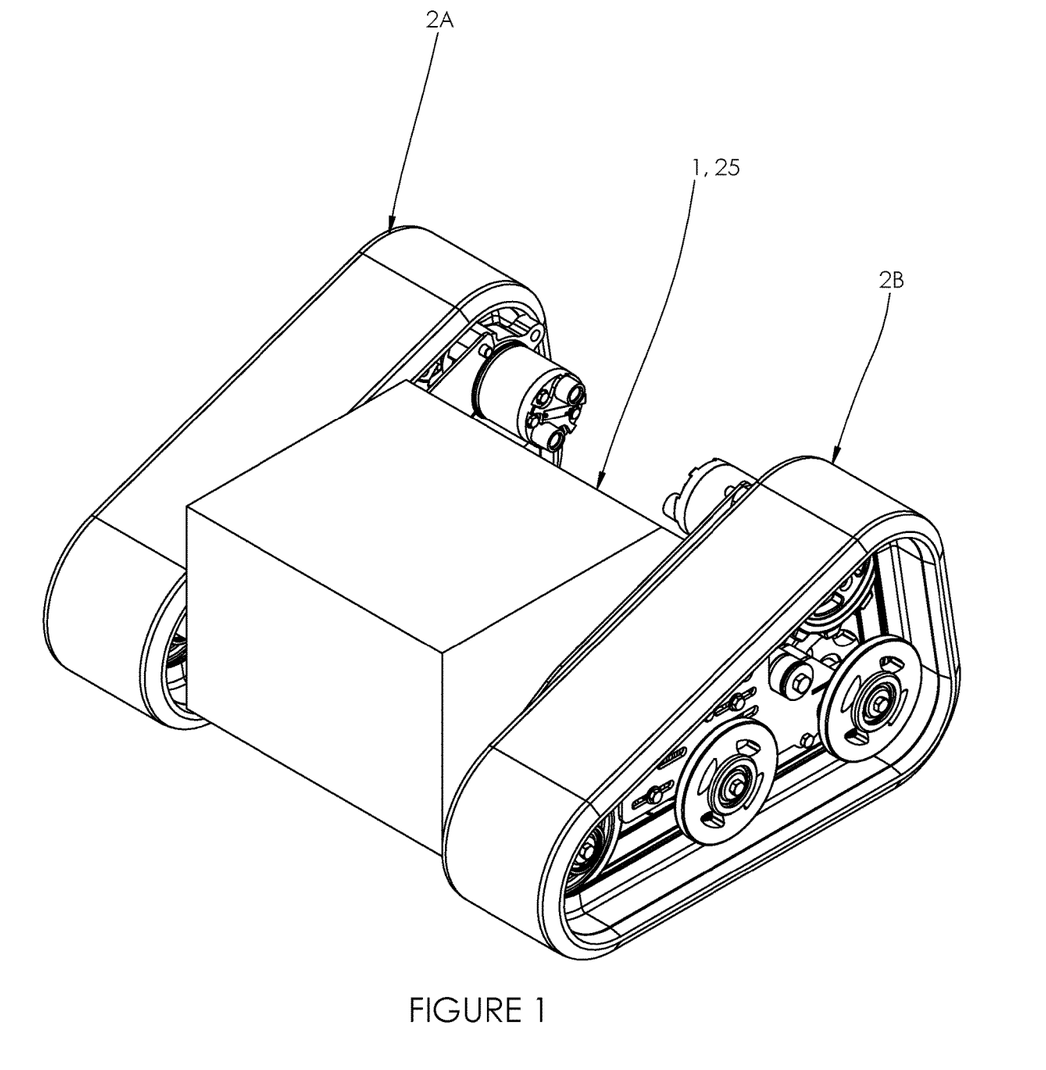
FIG. 1 is a perspective view of a utility vehicle body coupled to two endless track carriage assemblies, according to one embodiment.

FIG. 1 illustrates an exemplary embodiment of a utility vehicle body shown schematically at 1. The utility vehicle body 1 is supported by first and second endless track carriage assemblies 2A and 2B, and can include an engine 25. For ease of illustration, the following description proceeds with respect to carriage assembly 2B. However, it should be understood that carriage assembly 2A can have a similar configuration to carriage assembly 2B, as desired.

Figure 2:
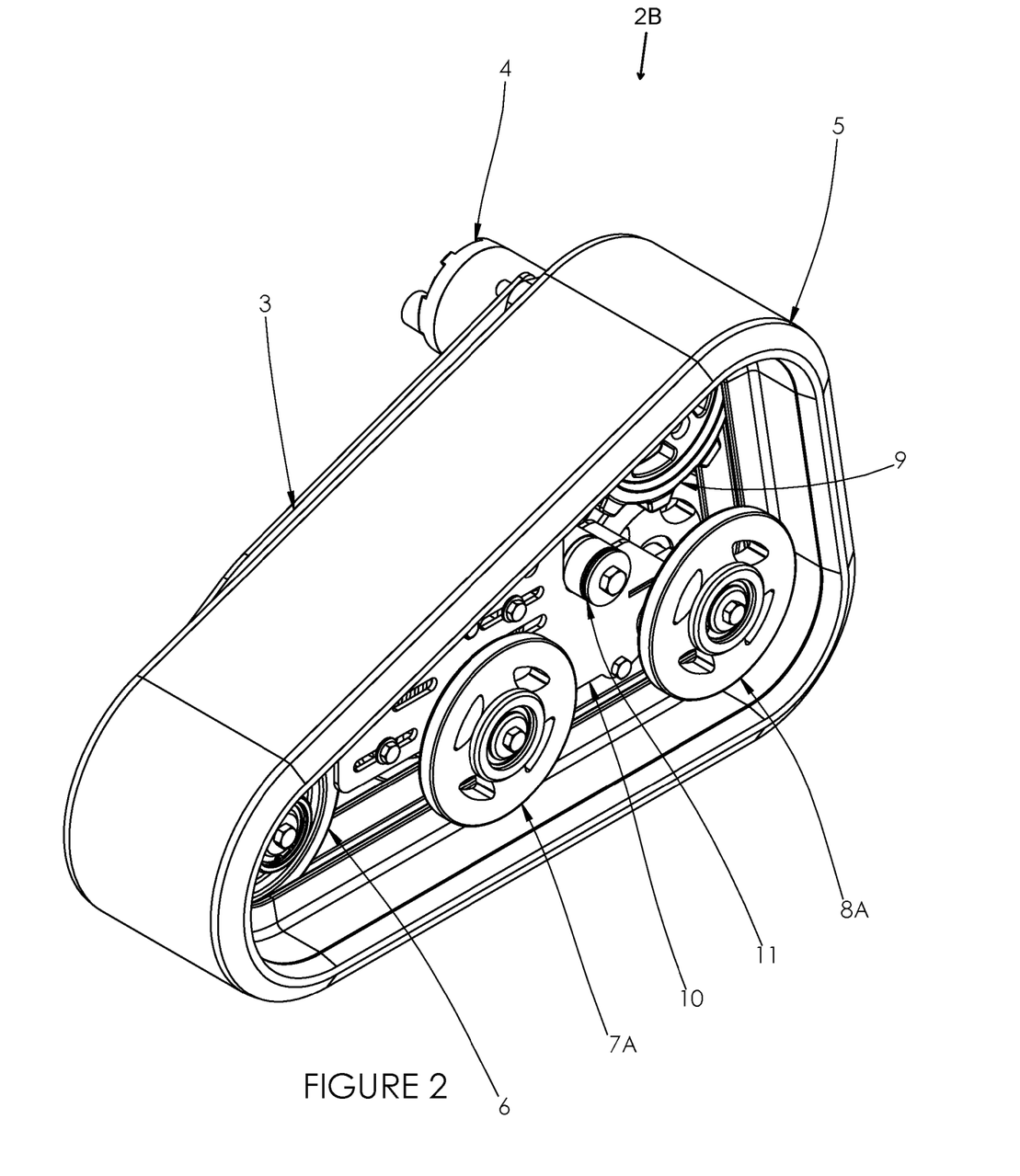
FIG. 2 is a perspective view of one of the track carriage assemblies of FIG. 1.
Figure 3:
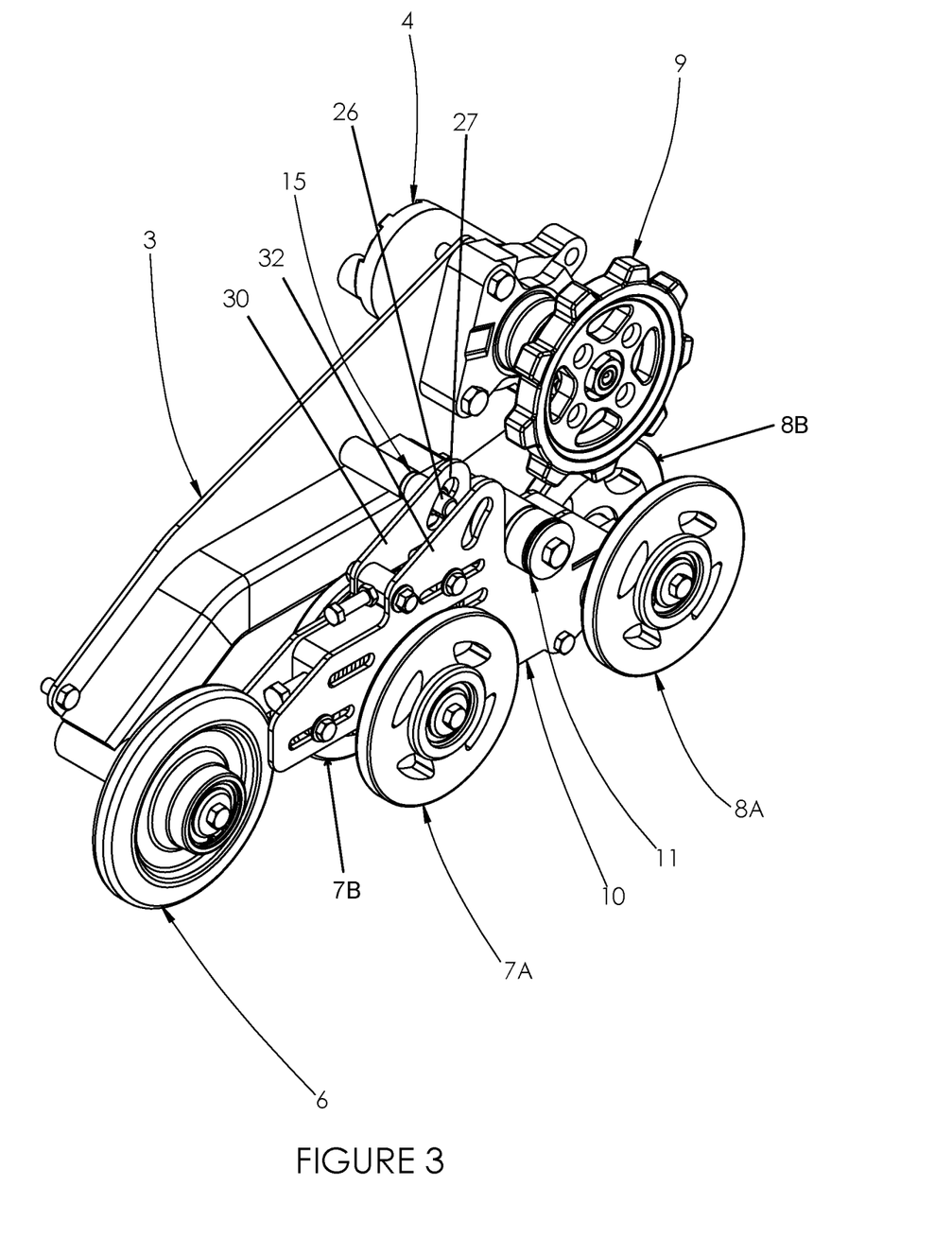
FIG. 3 is a perspective view of the track carriage assembly of FIG. 2 with the track removed to illustrate carriage components.

Referring to FIGS. 2 and 3, the carriage assembly 2B can include a carriage frame 3 (also referred to as a primary frame assembly). In some embodiments, the carriage frame 3 can be configured to be mounted and removed from the utility vehicle body 1 as a complete unit. A first idler wheel 6 is rotatably mounted to the carriage frame 3 such that the first idler wheel 6, the carriage frame 3, and the utility vehicle body 1 are configured to move (e.g., pivot) together.

The carriage assembly 2B can further include a sub-carriage 10 (also referred to as a secondary frame assembly). In the illustrated embodiment, the sub-carriage 10 can be located rearwardly of the first idler wheel 6, and can be pivotably coupled to the carriage frame 3 by a pivot pin 11. With reference to FIG. 3, the sub-carriage 10 can include a first frame member 30 and a second frame member 32 oriented parallel to and spaced apart from each other. The first and second frame members 30, 32 can be coupled to each other by a plurality of pins or bolts, as described in greater detail below.

In the illustrated embodiment, pivoting motion of the sub-carriage 10 relative to the carriage frame 3 (or vice versa) can be limited by a pivot limiter 15 including a pivot or guide pin 26 configured to be inserted into and move within a corresponding curved opening or slot 27 defined in the first frame member 30 of the sub-carriage 10 (FIG. 3). In other embodiments, the guide pin 26 can extend between the first and second frame members 30, 32 and into a slot similar to the slot 27 defined in the second frame member 32. The sub-carriage 10 can further include a pair of second idler wheels 7A and 7B located rearwardly of the first idler wheel 6, and a pair of idler wheels 8A and 8B located rearwardly of the idler wheels 7A, 7B. A drive wheel or drive sprocket 9 can be coupled to the carriage frame 3 above the sub-carriage 10.

The carriage frame 3 can further include a motor 4 having a drive shaft coupled to the drive sprocket 9. In the illustrated embodiment, the motor 4 can be configured as a hydraulic motor. However, in other embodiments the motor 4 may be any system for providing motive power to the drive sprocket, such as a powered axle, an electric motor, etc.

In the illustrated embodiment, the axes of rotation of the drive sprocket 9, the first idler wheel 6, the second idler wheels 7A and 7B, the third idler wheels 8A and 8B, and the pivot pin 11 can all be parallel to each other and perpendicular to the direction of motion of the utility vehicle body 1. Returning to FIG. 2, an endless or continuous track 5 can be situated around the first idler wheel 6, the second idler wheels 7A and 7B, the third idler wheels 8A and 8B, and the drive sprocket 9 such that the idler wheels and the drive sprocket engage the track. Rotational motion of the drive shaft of the motor 4 can cause corresponding rotation of the drive sprocket 9, and thereby of the endless track 5, which can propel the utility vehicle body 1. In some embodiments, the continuous track 5 can be configured as a belt, or as a chain including a plurality of links depending upon, for example, the particular application.

Figure 4:
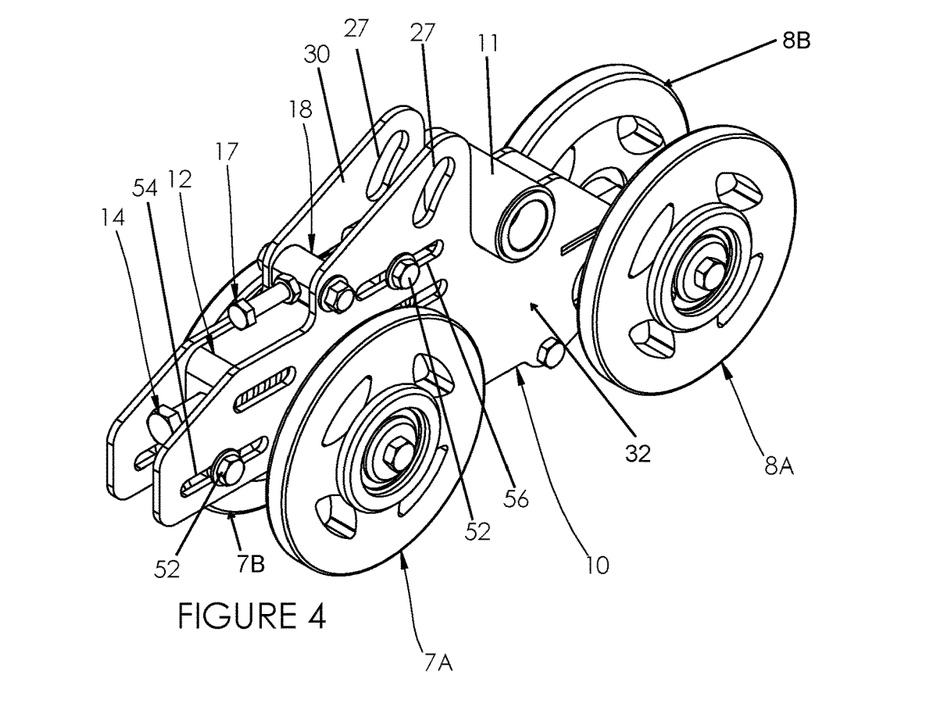
FIG. 4 is a perspective view of a sub-carriage assembly of the track carriage assembly of FIG. 2.
Figure 5:
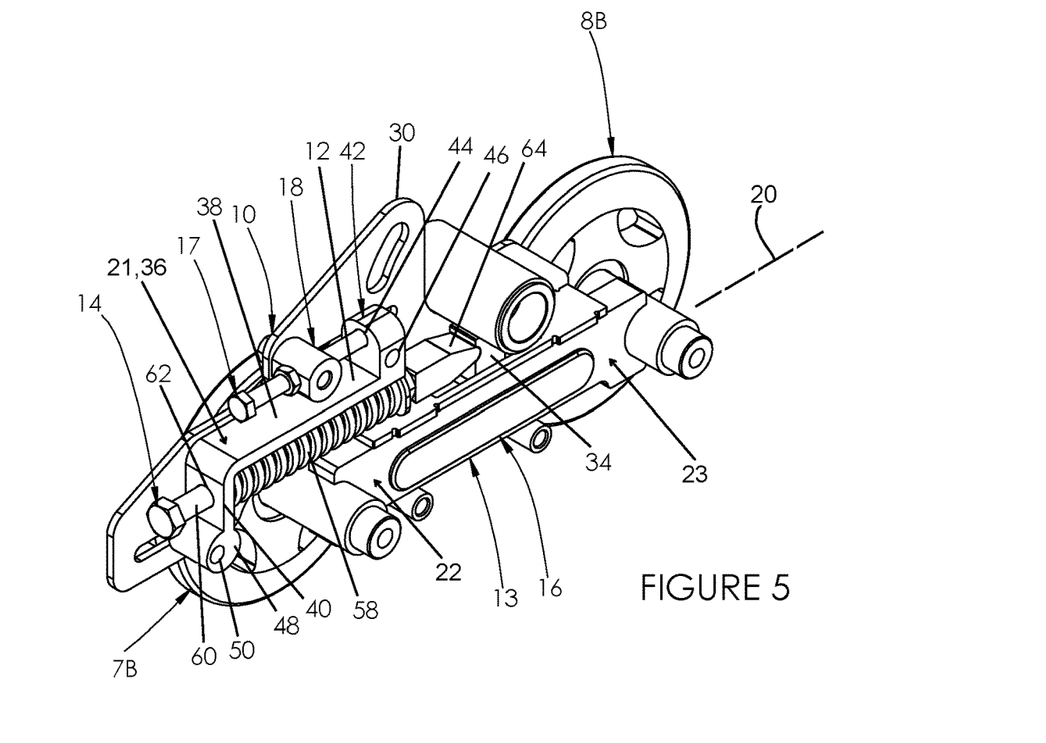
FIG. 5 is a perspective view of the sub-carriage assembly of FIG. 4 with a frame member removed for purposes of illustration.

FIGS. 4 and 5 illustrate the sub-carriage 10 in greater detail. FIG. 4 shows the sub-carriage 10 with the second or exterior frame member 32 coupled to the sub-carriage, and FIG. 5 illustrates the sub-carriage with the second frame member 32 removed to expose the interior components. With reference to FIG. 5, the sub-carriage 10 can include an elongated frame member configured as a carrier member 13 (also referred to as an idler carrier). The carrier member 13 can be configured to translate longitudinally relative to the sub-carriage 10 along a longitudinal axis 20. More specifically, the carrier member 13 can be situated between and movable relative to the first frame member 30 and the second frame member 32. The carrier member 13 can include bushings 16 to facilitate motion of the carrier member 13. As illustrated in FIG. 5, the second idler wheels 7A and 7B can be rotatably coupled to a first end portion 22 of the carrier member 13, and the third idler wheels 8A and 8B can be rotatably coupled to a second end portion 23 of the carrier member 13. The carrier member 13 can also include an engagement portion 34 located between the first and second end portions 22 and 23. In the illustrated configuration, the engagement portion 34 can extend upwardly from the carrier member 13, and can be configured to engage a spring assembly, as described in greater detail below.

With reference to FIG. 5, the sub-carriage 10 can include a tension adjustment assembly generally indicated at 21. The tension adjustment assembly 21 can include a tension bracket 12 mounted to the sub-carriage 10. The tension bracket 12 can be loosened such that it can be adjustable longitudinally within the sub-carriage 10 (e.g., between the first and second frame members 30 and 32). For example, the bracket 12 can include an L-shaped main body 36 having a first body portion 38 and a second body portion 40. In the illustrated embodiment, the first body portion 38 can extend horizontally parallel to the longitudinal axis 20, and the second body portion 40 can extend vertically or downwardly from the first body portion 38 perpendicular to the longitudinal axis 20. The first body portion 38 can include a mounting portion 42 extending upwardly from the first body portion. The mounting portion 42 can define an opening 44 extending parallel to the longitudinal axis 20, and an opening 46 extending perpendicular to the longitudinal axis 20 (e.g., in a direction toward the vehicle body 1).

Meanwhile, the second body portion 40 can include a cylindrically-shaped mounting portion 48 defining an opening 50 extending perpendicular to the axis 20. As shown in FIG. 4, the openings 46 and 50 can be configured to receive pins or bolts 52. The bolts 52 can be inserted through corresponding slots 54 and 56 defined in the frame member 32. The slots 54 and 56 can extend horizontally parallel to the longitudinal axis 20. The frame member 30 can also define similar slots through which bolts can be inserted into the corresponding mounting portions 42 and 48 on the opposite side of the bracket member 12. When the bolts 52 are loosened, the bolts can slide in the respective slots 54 and 56 such that the bracket member 12 can be moved longitudinally relative to the frame members 30 and 32. The bolts 52 can then be tightened against the frame members 30 and 32 to secure the bracket member 12 at a selected position relative to the frame members 30 and 32.

Figures 6, 7, 8:
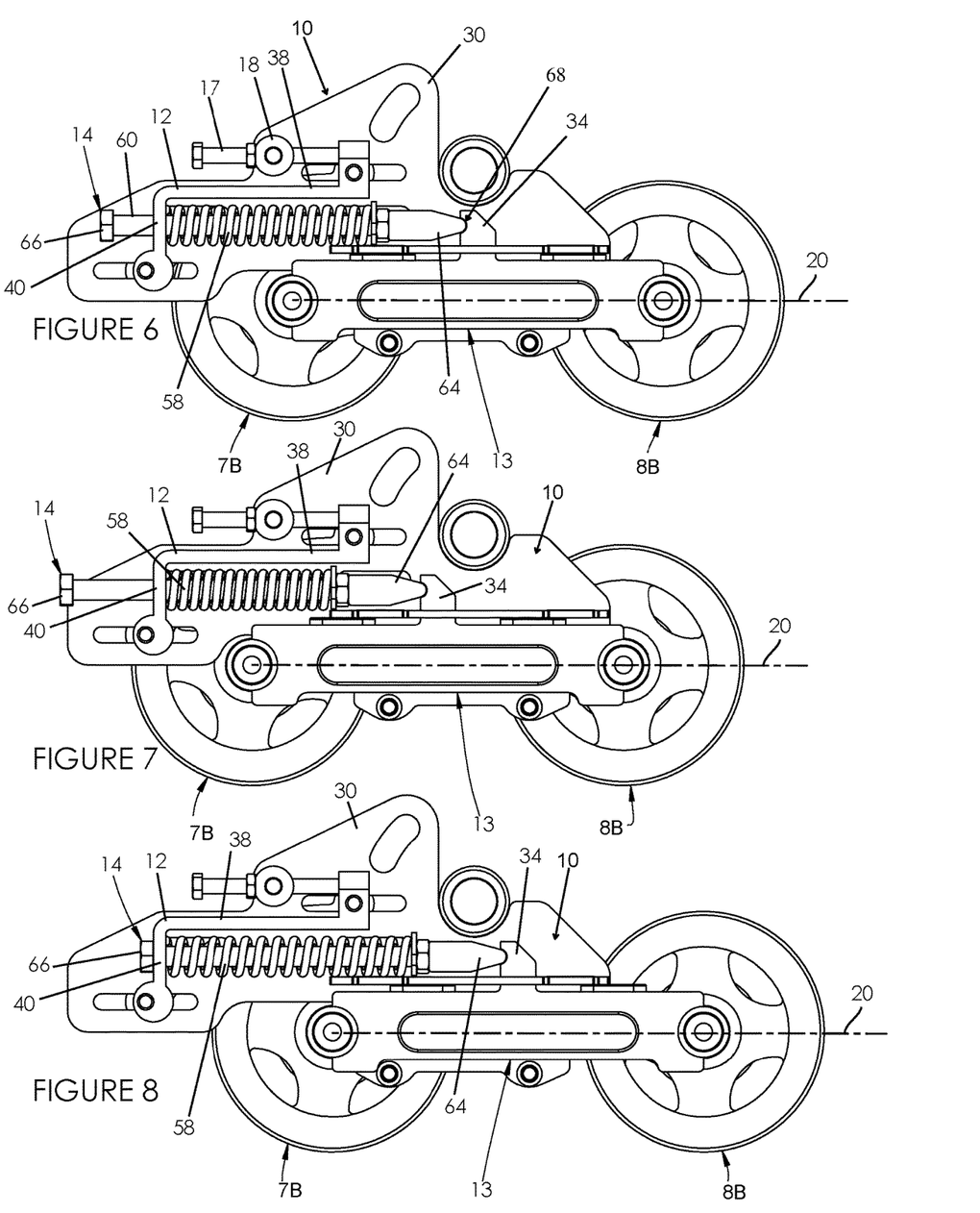
FIG. 6 is a side elevation view of the sub-carriage assembly of FIG. 4 illustrating an idler carrier in a position corresponding to motion of the utility vehicle on level terrain.
FIG. 7 is a side elevation view of the sub-carriage assembly of FIG. 4 illustrating the idler carrier at a forward limit of motion.
FIG. 8 is a side elevation view of the sub-carriage assembly of FIG. 4 illustrating the idler carrier at a rear limit of motion.

A spring assembly 14 including a coil spring 58 can be situated such that the spring acts between the tension bracket 12 and the carrier member 13. The spring assembly 14 can further include a pin member 60. The pin member 60 can extend through an opening 62 defined in the second body portion 40 of the bracket member 12, and through the spring 58. The pin 60 can be movable through the opening 62 relative to the bracket member 12 as the spring 58 extends and compresses with motion of the carrier member 13. Referring to FIGS. 5 and 6, the pin member 60 can include an engagement portion 64 including a tapered head configured to engage the engagement portion 34 of the carrier member 13. Thus, in the illustrated embodiment, the spring 58 can bear against the second body portion 40 of the tension bracket 12 at one end, and against the engagement portion 64 of the pin member 60 at the opposite end. In the illustrated embodiment, the engagement portion 34 of the carrier member 13 can define a recess 68 (FIG. 6), which can be configured to receive the rounded head of the engagement portion 64. In certain embodiments, the bracket member 12, the spring 58, and/or the pin member 60 can be located above the carrier member 13 so as not to interfere with motion of the carrier member.

Referring again to FIG. 5, a tension adjustment screw mount 18 can be mounted to the sub-carriage assembly 10 between the first and second frame members 30 and 32. A tension adjustment screw 17 can be threaded through the tension adjustment screw mount 18 and into the opening 44 of the mounting portion 42 to engage the tension bracket 12. This can allow for adjustment of the force applied to the carrier member 13 and the tension bracket 12 by the spring assembly 14. For example, by first loosening the bolts 52 securing the tension bracket 12 to the frame members 30 and 32, and rotating the tension adjustment screw 17, the distance between the second body portion 40 of the tension bracket 12 and the carrier member 13 can be changed (e.g., when the utility vehicle is parked and the carrier member 13 and the idler wheels 7A, 7B, 8A, and 8B are prevented from moving). This can vary the amount by which the spring 58 is compressed, thereby varying the force applied to the carrier member 13 by the spring. This allows a user to adjust the tension applied to the track 5 by varying the "neutral" or "default" position of the carrier member 13 along the longitudinal axis 20 and, thus, the position of the second idler wheels 7A, 7B and the third idler wheels 8A, 8B with respect to the primary frame assembly 3.

Vertical displacement of the second idler wheels 7A and 7B or of the third idler wheels 8A and 8B can induce pivoting of the sub-carriage 10 with respect to the carriage frame 3 about the pivot 11. Meanwhile, longitudinal motion of the carrier member 13 can vary the distance between the first idler wheel 6 and the second idler wheels 7A, 7B and the third idler wheels 8A, 8B, allowing the third idler wheels 8A and 8B to maintain a preselected tension on the track 5 as the carriage frames 3 and 10 move relative to one another. In the illustrated embodiment, the carrier member 13 is a rigid member, and the distance between the second idler wheels 7A, 7B and the third idler wheels 8A, 8B is fixed, although it should be understood that other configurations are possible wherein the second idler wheels 7A, 7B and the third idler wheels 8A, 8B are longitudinally movable relative to one another.

FIGS. 6-8 illustrate motion of the carrier member 13 and representative positions of the spring assembly 14. FIG. 6 illustrates the carrier member 13 in a position corresponding to a position of the carrier member when the carriage assembly 2B is coupled to the utility vehicle 1 and located on level terrain. In FIG. 6, the positions of the carrier member 13, the spring 58, and the pin member 60 with respect to the longitudinal axis 20 correspond to an initial, neutral, or default state related to the selected positioning of the bracket member 12. As shown in FIG. 6, the spring 58 is compressed in this position such that force is applied to the track 5 by the third idler wheels 8A and 8B to maintain a selected amount of tension in the track.

FIG. 7 illustrates the carrier member 13 at a first limit of motion (e.g., in a forward direction with respect to the utility vehicle 1, to the left in the figure). In the position illustrated in FIG. 7, the spring 58 is compressed beyond the position illustrated in FIG. 6, and a portion of the shank of the pin member 60 has moved to the left through the opening 62 in the second body portion 40 of the bracket member 12. As a result, the carrier member 13 and, thereby, the third idler wheels 8A and 8B are translated to the left as compared to the position illustrated in FIG. 6. This reduces the tension of the track 5, which can be useful during, for example, assembly or repair of the carriage.

Figure 12:
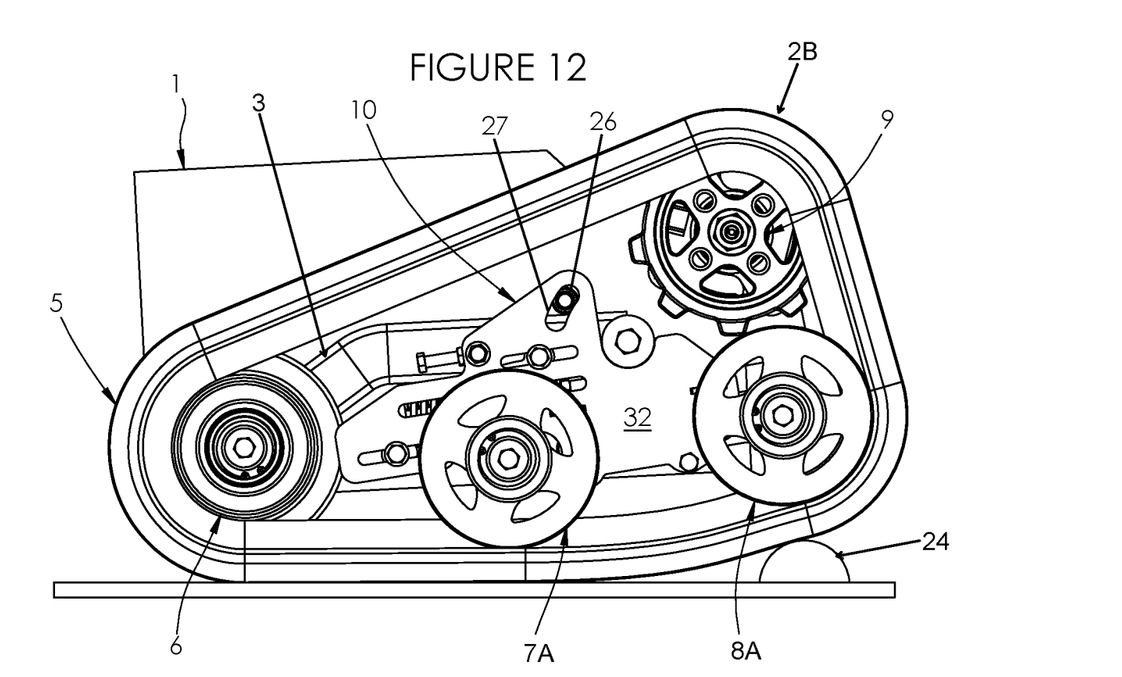

FIG. 8 illustrates the carrier member 13 at a second limit of motion (e.g., in a rearward direction with respect to the utility vehicle 1, to the right in the figure). In the position illustrated in FIG. 8, the spring 58 is compressed to a lesser degree than in the position shown in FIG. 6, and a head 66 of the pin member 60 is shown contacting the second body portion 40 of the bracket member 12. The position of the carrier member 13 and the spring 58 in FIG. 8 corresponds to motion of the utility vehicle 1 over terrain in which the sub-carriage 10 is pivoted relative to the carriage frame 3 such that the third idler wheels 8A and 8B are elevated, as shown in FIG. 12.

Figure 9:
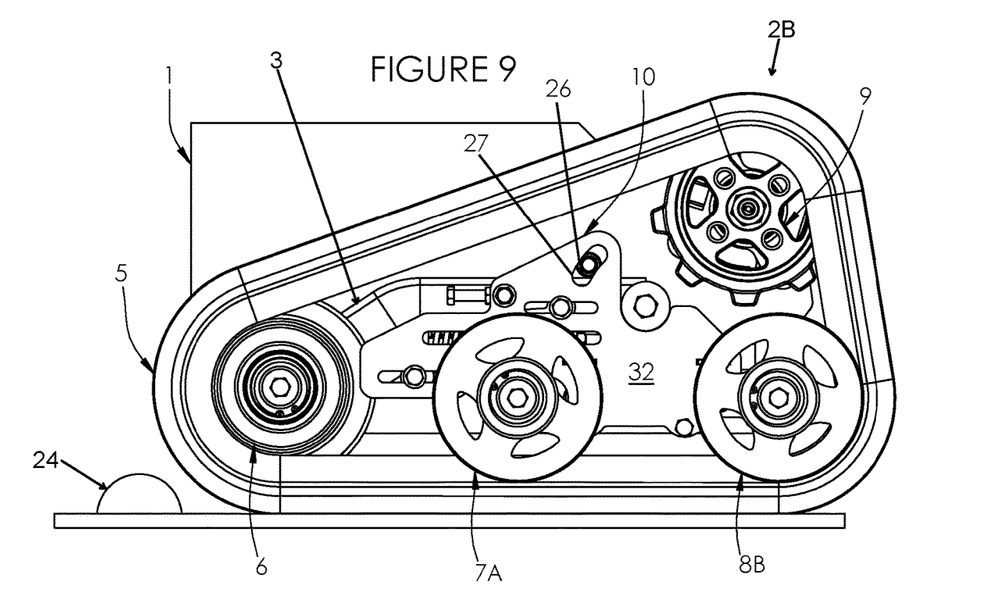
FIGS. 9-12 are side elevation views illustrating the carriage assembly of FIG. 2 traversing an obstacle.

FIGS. 9-12 illustrate the track carriage assembly 2B traversing an obstacle 24 on otherwise level terrain. In FIG. 9, prior to encountering the obstacle 24, the track 5 is in contact with the ground along the full length of the track between the first idler wheel 6 and the third idler wheels 8A and 8B. In this position, the carrier member 13 is in the position shown in FIG. 6, and the guide pin 26 is located midway between the upper and lower limits of the slot 27.

Figure 10:
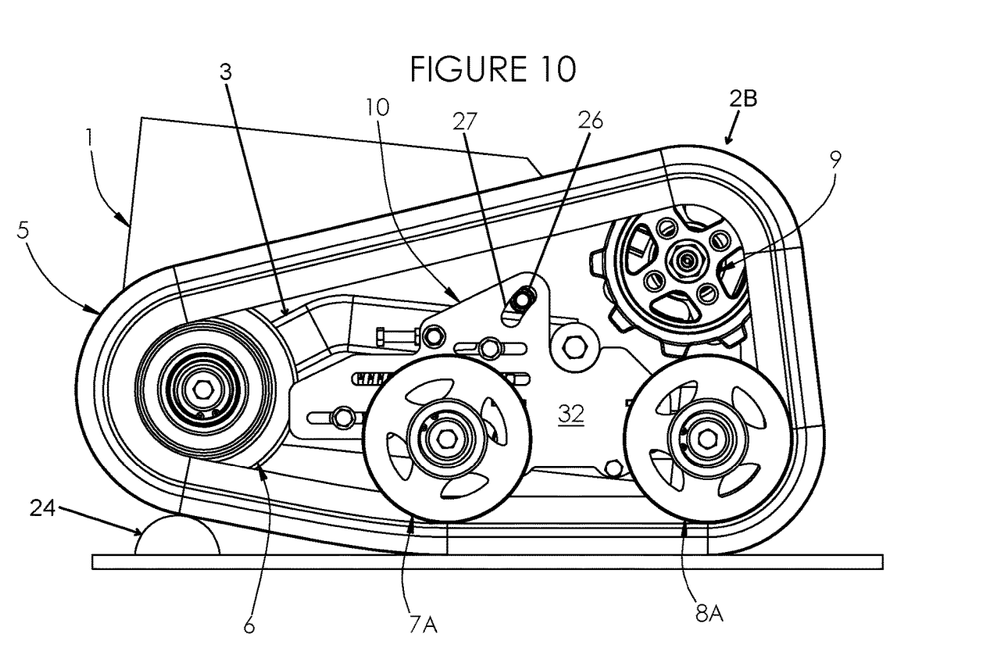

In FIG. 10, the obstacle 24 is located beneath the first idler wheel 6, which causes the carriage frame 3 (and thereby, the first idler wheel 6 and the body of the utility vehicle 1) to pivot upwardly and in the clockwise direction relative to the sub-carriage 10 such that the guide pin 26 moves toward the upper limit of the slot 27. The endless track 5 is engaged with the terrain at the first idler wheel 6, and between the second idler wheels 7A, 7B and the third idler wheels 8A, 8B. This causes the carrier member 13 to translate toward the position illustrated in FIG. 8 (to the left in FIG. 10), in which the spring 58 is extended relative to the neutral position illustrated in FIGS. 6 and 9. This can compensate for the reduction in the linear distance between the elevated first idler wheel 6 and the third idler wheels 8A and 8B that would otherwise result in slackening of the track 5.

Figure 11:
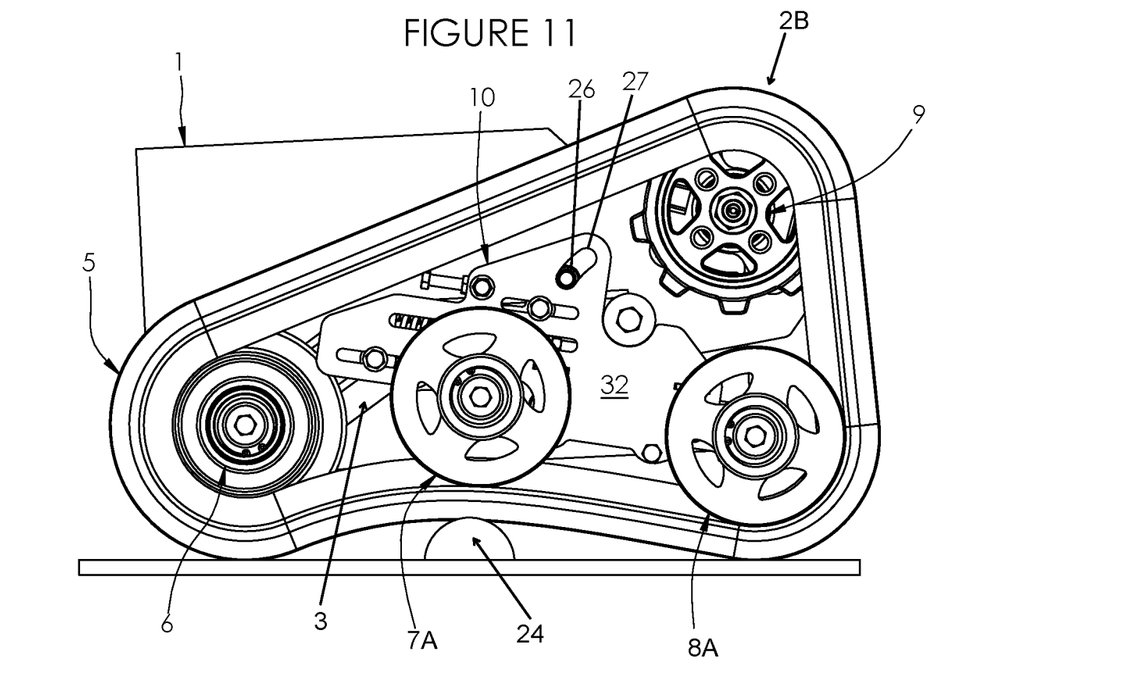

In FIG. 11, the obstacle 24 is located beneath the second pair of idler wheels 7A and 7B, which causes the sub-carriage 10 to pivot relative to the carriage frame 3 in the clockwise direction such that the second pair of idler wheels 7A and 7B are vertically displaced relative to the first idler wheel 6 and relative to the third idler wheels 8A and 8B. In this position, the vehicle body 1 can be minimally displaced in the vertical direction relative to its position in FIG. 9, and the track 5 is engaged with the terrain below each of the idler wheels 6, 7A, 7B, 8A, and 8B. The guide pin 26 is shown near the lower limit of the slot 27. The distance between the first idler wheel 6 and the third idler wheels 8A and 8B is reduced. In FIG. 11, the carrier member 13 has translated forward towards the position illustrated in FIG. 7, compressing the spring 58 and maintaining the selected degree of tension in the track 5. This can prevent an over-tensioned state of the track 5.

In FIG. 12, the obstacle 24 is located beneath the third pair of idler wheels 8A and 8B, which causes the sub-carriage 10 to pivot in the counter-clockwise direction relative to the carriage frame 3 such that the third idler wheels 8A and 8B are vertically displaced relative to the first and second idler wheels 6, 7A and 7B. In this position, the vehicle body 1 is minimally displaced in the vertical direction relative to its position in FIG. 9, and the guide pin 26 is located near the upper limit of the slot 27. The track 5 can engage the terrain along the portion of the track between the first idler wheel 6 and the second of idler wheels 7A and 7B, and beneath the third idler wheels 8A and 8B. In FIG. 12, the carrier member 13 has translated rearward (to the right in the figure) toward the position shown in FIG. 8, and the spring 58 is extended relative to the neutral position illustrated in FIGS. 6 and 9.

The continuous track carriage embodiments described herein can provide significant advantages over known track carriages. For example, motion of the carrier member 13 due to the force applied by the spring assembly 14 helps to ensure that the endless track 5 is held taut around idler wheels 6, 7A, 7B, 8A, and 8B, and around the drive sprocket 9, while traversing varied terrain. This allows the carriage 2B and, thereby, the track 5, to adapt to variable terrain over which the vehicle is driven. Allowing the secondary frame assembly 10 to pivot relative to the primary frame assembly 3 (or vice versa) allows each of the idler wheels or pairs of idler wheels to be displaced vertically by obstacles under the track 5. The spring assembly 14 and the movable carrier member 13 allow the carriage assembly to compensate for changes in the distance between the first idler wheel 6 and the third idler wheels 8A and 8B, while maintaining a selected degree of tension on the track 5. This allows the carriage assembly to travel over obstacles while maintaining a relatively large proportion of the track 5 in contact with the ground, which can improve traction, maneuverability, and fuel economy.

In alternative embodiments, the idler wheels can be configured in a variety of different ways. In some embodiments, the first idler wheel 6 (the non-tensioning idler in the illustrated embodiment) may be configured as the tensioning idler wheel. For example, the first idler wheel 6 may be capable of movement relative to the vehicle body and/or the carriage frame 3 to vary the tension in the endless track 5. A plurality of additional idler wheels may also be included. In some embodiments, the first idler wheel 6 and a subsequent idler wheel pair such as the second idler wheels 7A, 7B may be coupled to a sub-carriage similar to sub-carriage 10. The positions of the first and the third idler wheels may be reversed.

Additionally, although the illustrated embodiment includes a single first idler wheel 6, in other embodiments the carriage assembly can include a pair of idler wheels at the position of the idler wheel 6. Additionally, the second idler wheels 7A, 7B and the third idler wheels 8A, 8B can be configured as pairs of idler wheels, or as single idler wheels, as desired. The drive sprocket 9 may also be configured as a drive wheel. The carrier member 13 and/or the spring assembly 14 may also be located on the carriage frame 3 or the sub-carriage 10, as desired. Further, although the end of the carriage assembly 2B on which the first idler wheel 6 is mounted is treated as the "front" of the vehicle for purposes of this description, either end of the vehicle can be considered the "front," and the vehicle can be operable in both forward and reverse directions.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims. We therefore claim all the that comes within the scope of these claims.

The invention claimed is:

1. A carriage assembly, comprising:
a primary frame assembly;
a first idler wheel mounted to the primary frame assembly;
a secondary frame assembly pivotably mounted to the primary frame assembly; and
an idler wheel assembly coupled to the secondary frame assembly and movable with respect to the secondary frame assembly along a longitudinal axis of the idler wheel assembly, the idler wheel assembly including at least one second idler wheel mounted to the idler wheel assembly and at least one third idler wheel mounted to the idler wheel assembly such that the at least one second idler wheel is located between the first idler wheel and the at least one third idler wheel;
wherein the first idler wheel is configured to pivot with the primary frame assembly relative to the secondary frame assembly; and
wherein the at least one second idler wheel and the at least one third idler wheel are configured to move with the idler wheel assembly relative to the secondary frame assembly along the longitudinal axis of the idler wheel assembly.

2. The carriage assembly of claim 1, further comprising a spring disposed between the secondary frame assembly and the idler wheel assembly such that motion of the idler wheel assembly relative to the secondary frame assembly compresses and extends the spring.

3. The carriage assembly of claim 2, wherein the idler wheel assembly includes a carrier member, and the at least one second idler wheel and the at least one third idler wheel are mounted at opposite ends of the carrier member.

4. The carriage assembly of claim 3, wherein the secondary frame assembly comprises:
a frame member; and
a bracket member coupled to and extending outwardly from the frame member;
wherein the spring extends between the bracket member and the carrier member.

5. The carriage assembly of claim 4, wherein a position of the bracket member relative to the frame member is adjustable to adjust tension in the spring.

6. The carriage assembly of claim 4, wherein the bracket member comprises an L-shaped main body having a first portion extending parallel to the spring and a second portion extending perpendicular to the spring.

7. The carriage assembly of claim 6, wherein:
the second portion of the bracket member includes an opening; and
the secondary frame assembly further comprises a pin member extending through the opening in the second portion of the bracket member, through the spring, and engaging the carrier member.

8. The carriage assembly of claim 7, wherein the pin member and the spring are disposed above the carrier member, and the carrier member comprises an extension portion configured to engage the pin member.

9. The carriage assembly of claim 4, wherein the frame member defines a curved guide opening configured to receive a guide member coupled to the primary frame assembly.

10. The carriage assembly of claim 9, wherein:
the frame member is a first frame member;
the secondary frame assembly further comprises a second frame member parallel to and spaced apart from the first frame member; and
the carrier member, the spring, and the bracket member are disposed between the first and second frame members.

11. The carriage assembly of claim 10, further comprising:
a pair of second idler wheels coupled to the carrier member;
a pair of third idler wheels coupled to the carrier member; and
wherein the first and second frame members of the secondary frame assembly are disposed between the pair of second idler wheels and between the pair of third idler wheels.

12. The carriage assembly of claim 2, wherein motion of the idler wheel assembly along its longitudinal axis maintains a preselected tension in the track.

13. The carriage assembly of claim 1, further comprising a drive sprocket coupled to the primary frame assembly.

14. The carriage assembly of claim 13, further comprising a track extending from the first idler wheel to the at least one second idler wheel, the at least one third idler wheel, the drive sprocket, and back to the first idler wheel.

15. A vehicle comprising the carriage assembly of claim 1.

16. A carriage assembly, comprising:
a first frame member;
a first idler wheel coupled to the first frame member;
a second frame member pivotably coupled to the first frame member;
a carrier member comprising a first end portion, a second end portion, and a longitudinal axis;
a spring coupled to the second frame member at one end of the spring and coupled to the carrier member at the opposite end of the spring such that motion of the carrier member along its longitudinal axis causes extension and compression of the spring;
a second idler wheel coupled to the first end portion of the carrier member and movable therewith relative to the second frame member;
a third idler wheel coupled to the second end portion of the carrier member and movable therewith relative to the second frame member;
a drive sprocket coupled to the first frame member; and
a track extending from the first idler wheel to the second idler wheel, the third idler wheel, the drive sprocket, and back to the first idler wheel;
wherein when the carriage assembly traverses an obstacle, the first frame member and the first idler wheel pivot relative to the second frame member, and the second idler wheel, the third idler wheel, and the carrier member move relative to the second frame member under influence of the spring to maintain a preselected tension in the track.

17. The carriage assembly of claim 16, wherein:
the carriage assembly further comprises a bracket member coupled to the second frame member;
the spring extends between the bracket member and the carrier member; and
the bracket member is positionally adjustable relative to the second frame member to adjust tension in the spring.

18. The carriage assembly of claim 17, wherein:
the carriage assembly further comprises a third frame member spaced apart from the second frame member and coupled thereto; and
the bracket member and the carrier member are disposed between and movable relative to the second and third frame members.

19. The carriage assembly of claim 17, further comprising a pin member extending through the bracket member, through the spring, and engaging the carrier member.

20. The carriage assembly of claim 16, wherein the second frame member defines a curved guide opening configured to receive a guide member coupled to the primary frame assembly.

* * * * *